US010868455B2

(12) United States Patent
Rienecker et al.

(10) Patent No.: US 10,868,455 B2
(45) Date of Patent: Dec. 15, 2020

(54) ROTOR OF A CURRENT-ACTIVATED ELECTRIC MACHINE HAVING AN IMPROVED SLOT FILLING

(71) Applicant: Bayerische Motoren Werke Aktiengesellschaft, Munich (DE)

(72) Inventors: Thorsten Rienecker, Munich (DE); Dragoljub Duricic, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 174 days.

(21) Appl. No.: 15/814,720

(22) Filed: Nov. 16, 2017

(65) Prior Publication Data
US 2018/0076680 A1 Mar. 15, 2018

Related U.S. Application Data

(63) Continuation of application No. PCT/EP2016/065957, filed on Jul. 6, 2016.

(30) Foreign Application Priority Data

Jul. 23, 2015 (DE) .......... 10 2015 213 887

(51) Int. Cl.
*H02K 3/34* (2006.01)
*H02K 15/12* (2006.01)
*H02K 3/52* (2006.01)
*H02K 3/487* (2006.01)
*H02K 15/10* (2006.01)

(52) U.S. Cl.
CPC .............. *H02K 3/527* (2013.01); *H02K 3/34* (2013.01); *H02K 3/487* (2013.01); *H02K 15/12* (2013.01); *H02K 15/10* (2013.01)

(58) Field of Classification Search
CPC ........ H02K 3/527; H02K 3/487; H02K 15/12; H02K 15/10; H02K 3/30; H02K 3/34
USPC ................................... 310/214, 215
See application file for complete search history.

(56) References Cited

U.S. PATENT DOCUMENTS

| 4,432,135 A * | 2/1984 | Greenlee ................ H02K 3/527 29/598 |
| 4,607,183 A | 8/1986 | Rieber et al. |
| 2006/0066173 A1 | 3/2006 | Kim et al. |

(Continued)

FOREIGN PATENT DOCUMENTS

| CN | 104160595 A | 11/2014 |
| DE | 35 90 574 C2 | 8/1990 |

(Continued)

OTHER PUBLICATIONS

Machine Translation, Hosozawa, JP-2004350434-A, Dec. 2004. (Year: 2004).*

(Continued)

*Primary Examiner* — Thomas Truong
(74) *Attorney, Agent, or Firm* — Crowell & Moring LLP

(57) ABSTRACT

A rotor of a current-activated electric machine has a plurality of windings which are arranged on the rotor, slots being formed between the windings. A textile has a plurality of fibers connected to one another in flat contact. The textile is arranged in at least one slot, and the textile is impregnated with a filling material which in the normal operational state of the rotor is in a solid state.

16 Claims, 1 Drawing Sheet

(56) References Cited

U.S. PATENT DOCUMENTS

| | | | | |
|---|---|---|---|---|
| 2008/0246354 | A1* | 10/2008 | Asao | H02K 3/345 310/45 |
| 2009/0045692 | A1 | 2/2009 | Rozier et al. | |
| 2010/0090559 | A1* | 4/2010 | Weber | H02K 3/487 310/214 |
| 2011/0001372 | A1* | 1/2011 | Dutau | H02K 1/32 310/65 |
| 2011/0121678 | A1 | 5/2011 | Lape et al. | |
| 2012/0235534 | A1* | 9/2012 | Chamberlin | H02K 3/345 310/215 |
| 2014/0183989 | A1* | 7/2014 | Lenschow | H02K 3/325 310/54 |
| 2015/0035394 | A1 | 2/2015 | Bulatow et al. | |
| 2015/0076935 | A1 | 3/2015 | Bulatow et al. | |

FOREIGN PATENT DOCUMENTS

| | | |
|---|---|---|
| DE | 10 2010 060 756 A1 | 5/2011 |
| DE | 20 2012 000 842 U1 | 2/2012 |
| EP | 0 379 012 A2 | 7/1990 |
| FR | 1 137 505 A | 5/1957 |
| GB | 1 574 746 A | 9/1980 |
| JP | 2004350434 A * | 12/2004 |

OTHER PUBLICATIONS

International Search Report (PCT/ISA/210) issued in PCT Application No. PCT/EP2016/065957 dated Oct. 7, 2016 with English translation (five pages).

German-language Written Opinion (PCT/ISA/237) issued in PCT Application No. PCT/EP2016/065957 dated Oct. 7, 2016 (six pages).

German-language Search Report issued in counterpart German Application No. 10 2015 213 887.9 dated Apr. 18, 2016 with partial English translation (10 pages).

Chinese-language Office Action issued in counterpart Chinese Application No. 201680028570.9 dated Jul. 9, 2019 with English translation (16 pages).

* cited by examiner

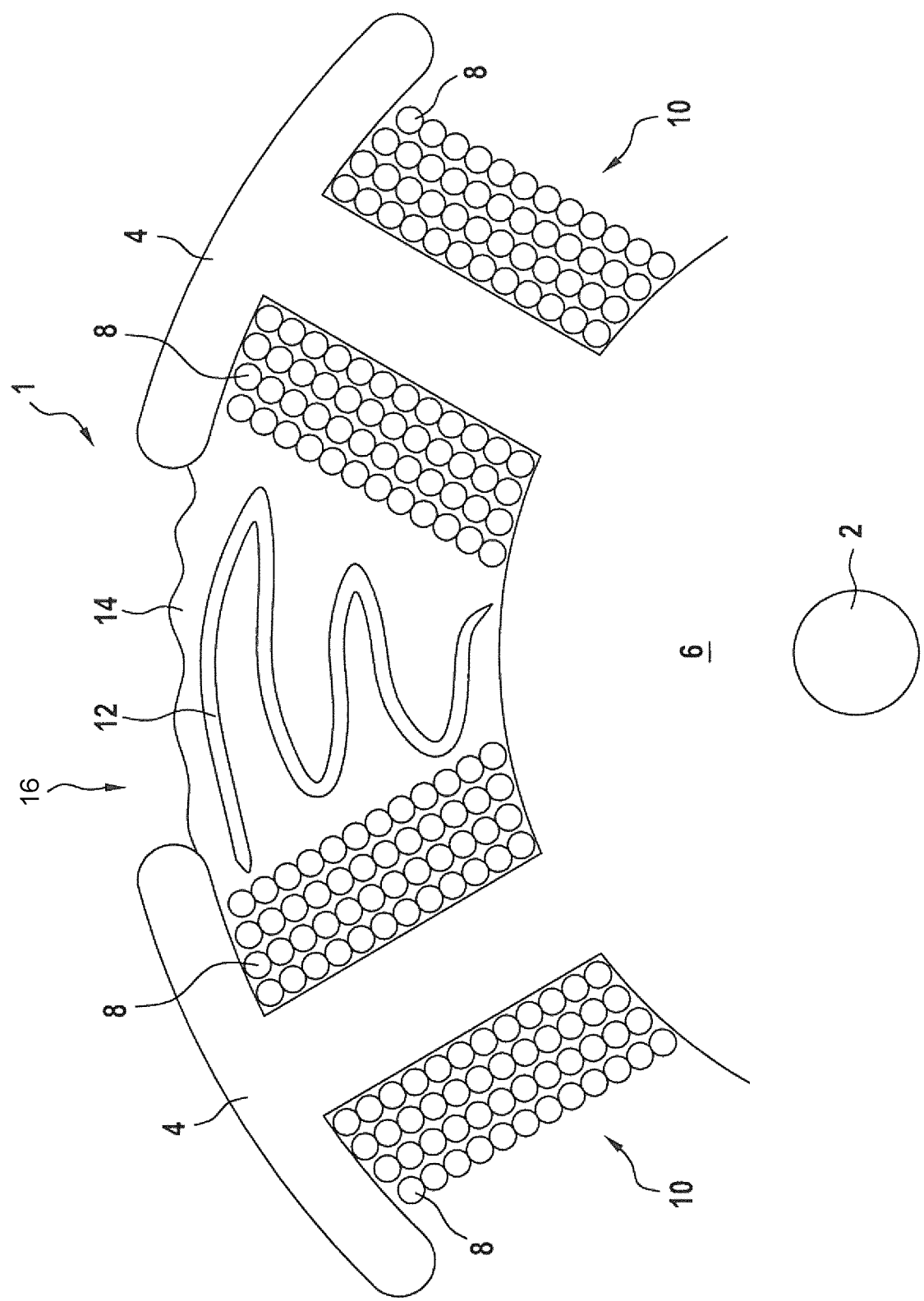

ROTOR OF A CURRENT-ACTIVATED ELECTRIC MACHINE HAVING AN IMPROVED SLOT FILLING

CROSS REFERENCE TO RELATED APPLICATIONS

This application is a continuation of PCT International Application No. PCT/EP2016/065957, filed Jul. 6, 2016, which claims priority under 35 U.S.C. § 119 from German Patent Application No. 10 2015 213 887.9, filed Jul. 23, 2015, the entire disclosures of which are herein expressly incorporated by reference.

BACKGROUND AND SUMMARY OF THE INVENTION

The present invention relates to a rotor of an electrical machine having an improved slot filling.

Separately excited or current-excited electrical machines are known, in which a rotating magnetic field is generated in the stator and a static magnetic field is generated in the rotor, which is mounted in a rotatable manner within the stator. As a result of the magnetic attraction and magnetic repulsion of the magnetic poles, a force or a torque is generated, which has the effect that the rotor rotates. Current-excited electrical machines have the advantage that a higher torque can be generated than in the case of an electrical machine with permanent magnets in the rotor, provided that the electrical machines are approximately the same size. Current-excited electrical machines have the drawback that the winding heads on the rotor can be destroyed starting from a rotational speed of as low as 5000 min−1. Usually, the rotor windings are applied to teeth of the rotor. Located between the rotor windings is a slot, groove or intermediate space in which no windings are applied. The windings are usually produced by means of a copper wire. On account of the centrifugal force, wires of the windings can be moved in the direction of the slot at high rotational speeds. At even higher rotational speeds, the windings can move out of the slot of the rotor in the direction of the stator, resulting in a mechanical blockage of the electrical machine.

Slot wedges are known from the prior art. These slot wedges have the drawback that they have to be matched comparatively exactly to the size of the slot. Since the size of the slot can vary on account of manufacturing tolerances, such slot wedges are not without problems in use.

It is also known to fix the windings by way of an impregnating resin. Such fixing improves the mechanical stability of the winding, but not significantly.

DE 10 2010 060 756 A1 discloses a locking wedge made of an aramid woven fabric.

DE 20 2012 000 842 U1 discloses a slot wedge, wherein an insulating compound is also introduced between the windings.

The prior art has the drawback that the slot wedge has to be matched to the windings of the rotor. The windings are subject to manufacturing tolerances. Consequently, the slot wedges are difficult to fit in many cases, since they do not have the requisite size.

The invention is based on the object of creating an improved rotor with improved stabilization of the windings at high rotational speeds.

The object of the invention is achieved by a rotor, a current-excited electrical machine and a method of producing same in accordance with embodiments of the invention.

A rotor of a current-excited electrical machine has a plurality of windings which are arranged on the rotor, wherein slots are formed between the windings. Typically, the windings are arranged on poles or teeth of the rotor. According to the invention, the rotor comprises a textile which has a plurality of fibers connected together in flat contact. The textile is arranged in at least one slot, wherein the textile is impregnated with a filling material which is in a solid state in the normal operating state of the rotor. The textile can exhibit at least 30% of the volume, preferably at least 50% of the volume, more preferably at least 75% of the volume of the slot between the windings.

Conventional rotors of current-excited electrical machines allow only a rotational speed of 5000 min−1 before the windings are destroyed by the centrifugal force. The inventors of the present invention have found that, as a result of the introduction of a textile into the slot between the windings and the subsequent filling of the slot by use of a filling material, which is in a solid state during the normal operating state of the rotor, the mechanical stability of the rotor can be increased to such an extent that it can be operated at much higher rotational speeds, for example 20,000 min−1. The rotor according to the invention can withstand circumferential speeds of up to 150 m/sec during operation.

The fibers of the textile may be aramid fibers. Aramid and/or aromatic polyaramid is a particularly temperature-resistant synthetic material which withstands, for example, load for more than 10,000 operating hours at 180° C.

The textile may be a woven fabric or a nonwoven. The woven fabric and/or the nonwoven may have aramid fibers. A nonwoven made of aramid fibers is known, for example, under the trade name Nomex from DuPont. Such a nonwoven has the advantage that it is absorbent and also provides sufficient mechanical stability to the windings of the rotor in conjunction with the filling material.

A textile may be arranged in a plurality of slots of the rotor. In another embodiment, the textile may be arranged in all the slots of the rotor. As a result, the production of the rotor can be simplified. In addition, it is possible to ensure that all slots are filled with the textile.

The filling material may be a resin and/or an impregnating resin. The filling material may be any desired fluid which can be absorbed by the nonwoven and subsequently cures.

The textile may be an aramid nonwoven or an aramid woven fabric in order to ensure the heat resistance of the composite. Aramid nonwovens and aramid woven fabrics absorb the resin or impregnating resin and give the windings of the rotor sufficient stability.

The invention also relates to a current-excited electrical machine having the above-described rotor.

The invention also relates to a method for producing a rotor of a current-excited electrical machine. The method comprises the step of filling a slot between two windings with a textile having a plurality of fibers connected in flat contact. The method also comprises the step of impregnating the textile with a filler which is in the liquid state during impregnation and is in the solid state during normal operation of the rotor. During the impregnation of the textile, the filler can be at a temperature of about at least 200° C., preferably at least 250° C., more preferably at least 300° C. The normal operating state of the rotor comprises a temperature range up to at most 180° C. However, the filler can also cure at lower temperatures, for example at room temperature.

The filler may be a resin or impregnating resin which cures under the action of temperature. Alternatively or additionally, the textile may be a nonwoven or a woven fabric. The fibers may exhibit aramid fibers and/or aromatic polyaramid.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 illustrates a section through a rotor according to an embodiment of the invention.

DETAILED DESCRIPTION OF THE DRAWING

FIG. 1 shows a partial section through a rotor 1. The rotor 1 has a plurality of laminate stacks 6 which are arranged rigidly on a spindle 2.

Each laminate stack 6 has a pole or a tooth 4. Arranged on each tooth 4 is a winding 10, wherein a copper wire 8 is wound around the tooth 4. It is possible for all windings 10 of the rotor 1 to be wound by use of a single wire 8.

According to the invention, a nonwoven 12, made for example of aramid fibers, is introduced into the slot 16. The nonwoven 12 can, as in FIG. 1, be arranged in the slot 16 in several layers wound one over another. However, it is also possible to roll up the nonwoven to a greater or lesser extent and then introduce it into the slot 6.

Once the nonwoven 12 has been arranged in the slot 16, the slot 16 is encapsulated, immersed or poured into with a resin 14. As a result, the nonwoven 12 is impregnated. The temperature of the resin 14 during impregnation is approximately in the region of room temperature or at temperatures of up to 200° C. The resin 14 solidifies at room temperature or at temperatures of up to 200° C. and below.

The solidified resin 14 and the nonwoven 12 form a slot closure of the slot 16, thereby ensuring that the centrifugal force cannot move the wires 8 in a winding out of their predetermined position. Consequently, the rotor 1 can be operated at a much higher rotational speed than is the case in rotors without a slot closure or in rotors which have only a resin as a slot closure.

The rotor according to the invention can be arranged in an electrical machine which drives a vehicle. Since the rotor has a higher rotational speed range, the electrical machine can be operated more efficiently and it may be possible to dispense with a manual transmission. Furthermore, the motor can be built in a smaller and lighter manner with the same performance as a result of the increase in rotational speed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotor of a current-excited electrical machine, comprising:
   a plurality of rotor teeth, each rotor tooth having a winding arranged around the respective rotor tooth, wherein a plurality of slots are formed each respectively between the respective winding of successive rotor teeth; and
   a textile which has a plurality of fibers, wherein the textile is arranged in at least one of the slots, and the textile is impregnated with a filling material which, in a normal operating state of the rotor, is in a solid state.

2. The rotor as claimed in claim 1, wherein the fibers are aramid and/or an aromatic polyaramid.

3. The rotor as claimed in claim 2, wherein the textile is a woven fabric or a nonwoven.

4. The rotor as claimed in claim 3, wherein the textile is arranged in all of the slots of the rotor.

5. The rotor as claimed in claim 1, wherein the textile is a woven fabric or a nonwoven.

6. The rotor as claimed in claim 1, wherein a textile is arranged, respectively, in a plurality of slots of the rotor.

7. The rotor as claimed in claim 1, wherein the filling material is: a resin, and/or an impregnating resin.

8. The rotor as claimed in claim 7, wherein the textile is: an aramid nonwoven, or an aramid woven fabric.

9. The rotor as claimed in claim 1, wherein the textile is: an aramid nonwoven, or an aramid woven fabric.

10. A current-excited electrical machine having a rotor as claimed in claim 1.

11. A method for producing a rotor of a current-excited electrical machine, the rotor including: a plurality of teeth, each rotor tooth having a winding arranged around the respective rotor tooth, wherein a plurality of slots are formed each respectively between the respective winding of successive rotor teeth, the method comprising the acts of:
   filling at least one of the slots between two windings of respective rotor teeth of the rotor with a textile having a plurality of fibers; and
   impregnating the textile with a filler, which during impregnation is in the liquid state and during normal operation of the rotor is in solid state.

12. The method as claimed in claim 11, wherein the filler is one of: a resin, or an impregnating resin.

13. The method as claimed in claim 12, wherein the textile exhibits one of: a nonwoven, or a woven fabric.

14. The method as claimed in claim 13, wherein the fibers are aramid fibers.

15. The method as claimed in claim 11, wherein the textile exhibits one of: a nonwoven, or a woven fabric.

16. The method as claimed in claim 11, wherein the fibers are aramid fibers.

* * * * *